March 17, 1925.
R. C. BARBOUR ET AL
1,529,734
MULTIPLE STAGE FISHING TOOL
Filed June 28, 1924
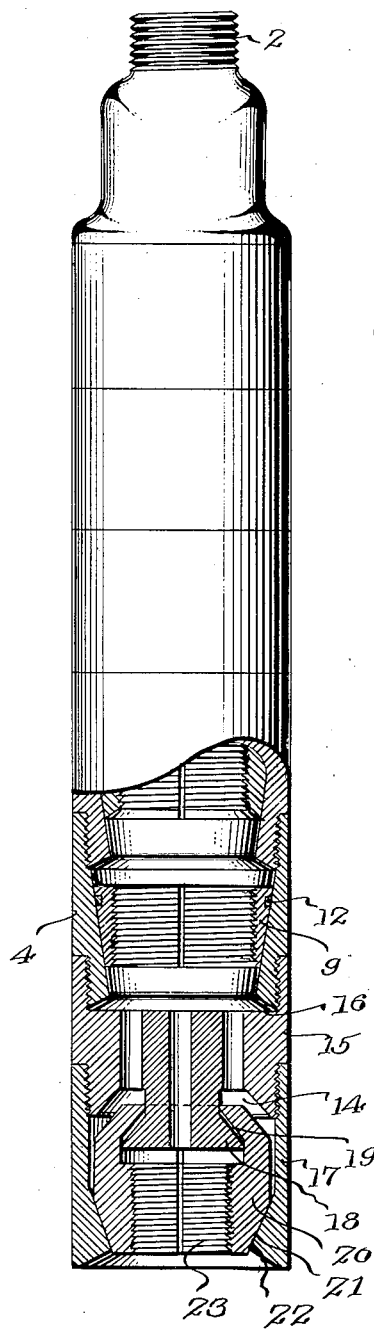
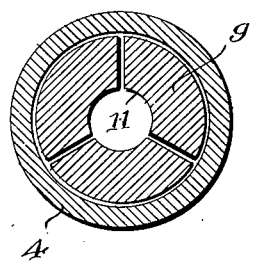
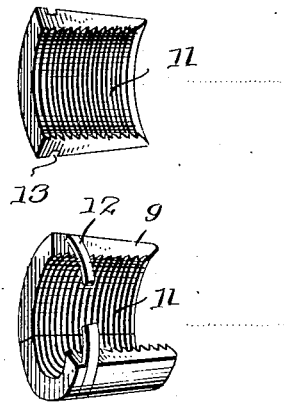
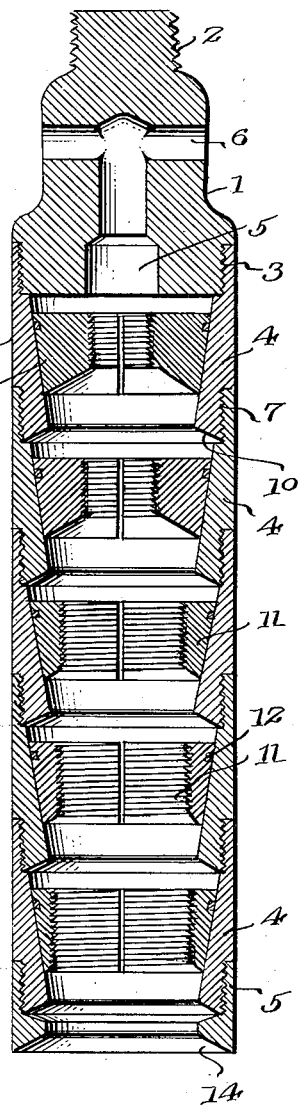
Russel C. Barbour, Inventor
Anderson Brown
by Jesse R. Stone, atty.

Patented Mar. 17, 1925.

1,529,734

UNITED STATES PATENT OFFICE.

RUSSELL CLYDE BARBOUR AND ANDERSON BROWN, OF CORSICANA, TEXAS.

MULTIPLE-STAGE FISHING TOOL.

Application filed June 28, 1924. Serial No. 722,926.

*To all whom it may concern:*

Be it known that we, RUSSELL C. BARBOUR and ANDERSON BROWN, citizens of the United States, residing at Corsicana, Texas, have invented a certain new and useful Improvement in Multiple-Stage Fishing Tools, of which the following is a specification.

Our invention relates to fishing tools to be employed in recovering rods, pipes and other similar broken parts from a deep well when they have been lost therein. It pertains particularly to the overshot type of fishing tool wherein the tool is adapted to telescope over the upper end of the broken member, and to thus grip it and assist in withdrawing it from the hole.

It is an object of the invention to provide an overshot fishing tool having a plurality of gripping members of varying diameter decreasing upwardly so that rods or pipe of different diameter may be recovered by the use of the same tool.

It is another object to provide adjustable gripping jaws in connection with a fishing tool of the character stated, having means on said jaws to hold the jaws in registered position so as to prevent their dropping into a hole and yet allowing free expansion of the jaws relative to each other.

Other objects and advantages, and means whereby they are accomplished, will become more clear from the description which follows.

Referring to the drawing herewith Fig. 1 is a side elevation, parts of the lower end thereof being broken away in central section for greater clearness, and illustrating a fishing tool embodying our invention. Fig. 2 is a central longitudinal section through the tool, the lower end thereof being equipped with a guide shoe. Fig. 3 is a transverse section on the line 3—3 of Fig. 2. Fig. 4 is a perspective view of one of the slip jaws employed with our invention, and Fig. 5 is a similar view illustrating the means by which adjacent jaws are held in horizontal alignment. Like numerals of reference are employed to designate like parts in all the views.

It is frequently desirable in the operations of removing pipe and rods and similar broken parts from the well, to employ an overshot adapted to receive and grip parts which have varying diameters, and in Fig. 2 we have shown an overshot fishing tool particularly adapted for that purpose.

There is an upper head 1, the upper end of which is threaded at 2 for connection with a drill stem or other pipe by means of which it may be introduced into and withdrawn from the well. The lower end of the head is threaded at 3 for connection to a nipple 4. The head is provided with a central passage 5 bored upwardly from the lower end to a point about midway thereof, to connect with laterally extending channels 6 leading to the outside of the head.

The nipples 4, of which we may provide any desired number, connected together as shown in Fig. 2, are cylindrical on the outer face, and have the upper end threaded internally for connection to the member next above it. The lower end of the nipple is reduced slightly in diameter and threaded at 7 for connection with the upper end of the next adjacent lower nipple 4. The inner face of the nipple is formed with a downwardly tapered wall forming a seat 8 to receive slips or jaws 9 therein. The tapered seat extends nearly to the lower end and then flares outwardly, as shown at 10 to provide a beveled lower face against which the piece of junk may contact and thus be directed into the central channel through the nipple.

The jaws 9 forming the slip within the bowl shaped seat are of any desired number, and we have shown three, as shown particularly in Fig. 3. The outer periphery of the jaws is tapered downwardly to fit the seat. The inner face of each of the jaws is cut with teeth 11, which are pointed upwardly and cut in a slightly spiral line to form a thread when the device is rotated. The jaws are held in alignment so as to move together in the seat by means of sectional rings 12 fitting in grooves 13 in the outer faces of the slip. The rings are formed flush with the outer face of the jaws and may be made in two or three sections as desired, and in assembling the jaws care is taken to place the sectional ring in such position that the spaces between the adjacent sections will not be in alignment with the spaces between adjacent jaws.

The lowermost of the nipples or bowls 4 is preferably connected with a guide shoe 5 which serves to protect the lower end of the tool and has an inwardly beveled lower face 14 to guide the tools into the central channel through the device.

It is contemplated that each of the nipples 4 thus arranged in tandem as described will be of approximately the same inner and outer diameter. The varying sizes of the central channels through the tool are obtained by making the walls of the slips constituting the jaws of varying thickness, the lower slips to be much thinner than the upper ones. The effect thereby obtained is a central passage upwardly into the tool which decreases in regular stages from a large to a relatively small diameter.

In Fig. 1 is shown a tool approximately as shown in Fig. 2, except that a special fishing tool is shown on the lower end thereof. The lower nipple 4 is connected with a block 15 which is cylindrical on its outer face and solid, except for a plurality of longitudinal passages 16 extending through the same, as shown in the drawing. The lower end of the block is threaded for engagement with a special shoe or nipple 17. The central portion of the block is formed into a downwardly flaring head 18 having a beveled upper shoulder 19 therein to engage with slips or jaws 20 fitting within the nipple 17.

The jaws 20 engaging around the head 18 are tapered at 21 adjacent the lower end, said tapered portion adapted to fit within a tapered seat 22 in the lower end of the nipple 17. The said jaws or slips 20 have a cylindrical inner toothed face 23 similar to the engaging faces upon the jaws 9 previously described. There is provided above the jaws 20 a space or chamber 24 sufficient to allow vertical play of the jaws within the seat 22 of the nipple.

In the operation of the device disclosed in Figs. 2 to 5, inclusive, the tool is placed on the lower end of the stem by means of which it is introduced into the well and moved downwardly so as to telescope over the upper end of pieces of broken pipes or rods. The upper end of said pipe or rods will be received in the central channel through the tool, and the tool will be forced downwardly over the same until the piece of broken pipe comes in contact with a set of slips through which it cannot pass. As the broken member moves into the central passage into the tool, the jaws will be moved upwardly to expand sufficiently to allow the pipe to be engaged therewith, when the tool is again drawn upwardly the teeth upon said jaws will then be engaged with the pipe or rod, and will be moved inwardly to grip the same firmly as the jaws move downwardly into their seat. By the use of this tool, ordinary pipe, rods and similar parts may be engaged by the tool and withdrawn from the well. Large tools, such as drill bits or other heavy parts having a threaded upper shank, cannot be received in such a tool and for this reason a gripping member such as that shown in the lower end of Fig. 1 may be employed for gripping the threaded upper ends of large tools.

It is obvious that as many of the sections 4 with sets of jaws therein may be employed as is desired, and when the exact diameter of the part to be engaged is known, but one or two stages of the tool need be employed, and in each case, the shoe 5 may be screwed on to the lower end of the bottom nipple. The jaws are allowed to freely expand as they are moved up, and to move together as they are again moved downwardly into their seats. The ring 12 however maintains them in alignment so that none of the jaws can drop away from the others and fall into the hole. The advantages of this type of construction will be apparent to those skilled in the art without further description.

What we claim as new and desire to protect by Letters Patent is:

1. A multiple stage fishing tool, comprising a head, a plurality of nipples detachably connected together at their adjacent ends, the upper one being attached to said head, downwardly tapered seats formed in each of said nipples, jaws fitting within said seats, said jaws having vertical inner toothed faces, means to hold said jaws in horizontal alignment, and a shoe at the lower end of the bottom nipple.

2. A multiple stage fishing tool comprising a head, a plurality of nipples connected together, the upper one of said nipples being screwed to said head and the lowermost nipple having a guide shoe thereon, downwardly tapered seats in each nipple, a plurality of toothed jaws tapered to fit slidably within said seats, and a sectional ring fitting in the outer faces of said jaws whereby each set of jaws presents a vertical surface, the inner diameter of adjacent sets decreasing from the lower to the upper end of said tool.

3. A multiple stage fishing tool comprising an upper head, a series of nipples connected to each other and to said head, downwardly tapered seats in said nipples, adjustable jaws tapered to fit in said seats on their outer faces and cylindrical on their inner faces, a sectional ring fitting in the outer faces of said jaws to hold them in horizontal alignment, said jaws being of varying thickness in adjacent nipples decreasing in the inner diameter from the lower nipple to the upper nipple.

4. A multiple stage fishing tool comprising a head, a plurality of nipples arranged in stages below said head, a downwardly tapered inner seat on each nipple, a plurality of jaws on each seat, means to hold said jaws in horizontal alignment, each of said sets of jaws being of uniform internal diameter, the thickness of adjacent sets of jaws decreasing from the upper nipple to the lower nipple, and means to guide the work into the said nipples.

In testimony whereof we hereunto affix our signatures this — day of May, A. D. 1924.

RUSSELL CLYDE BARBOUR.
ANDERSON BROWN.